US006977740B1

(12) United States Patent
Mandalia

(10) Patent No.: US 6,977,740 B1
(45) Date of Patent: Dec. 20, 2005

(54) METHOD AND SYSTEM FOR CENTRALIZED INFORMATION STORAGE RETRIEVAL AND SEARCHING

(75) Inventor: Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,431

(22) Filed: Mar. 29, 2000

(51) Int. Cl.[7] ............... G06K 15/00; H04M 11/00; H04N 11/00
(52) U.S. Cl. ............... 358/1.15; 379/100.01; 358/400; 707/10
(58) Field of Search ............... 707/10, 100, 1; 358/468, 404, 444, 532, 405, 406, 400, 403, 358/1.15; 379/100.01

(56) References Cited

U.S. PATENT DOCUMENTS

| 4,941,170 A | * | 7/1990 | Herbst ............... 379/100.07 |
| 5,555,100 A | * | 9/1996 | Bloomfield et al. ....... 358/402 |
| 5,907,598 A |   | 5/1999 | Mandalia et al. ...... 379/100.01 |
| 6,005,674 A | * | 12/1999 | Lin ............... 358/437 |
| 6,314,425 B1 | * | 11/2001 | Serbinis ............... 707/10 |
| 6,477,243 B1 | * | 11/2002 | Choksi et al. ......... 379/100.06 |
| 2002/0059162 A1 | * | 5/2002 | Shinoda ............... 707/1 |
| 2002/0087559 A1 | * | 7/2002 | Pratt ............... 707/100 |
| 2002/0138847 A1 | * | 9/2002 | Abrams ............... 725/105 |

* cited by examiner

Primary Examiner—Jerome Grant, II
(74) Attorney, Agent, or Firm—Jon A. Gibbons; Jeffrey Giunta; Fleit, Kain, Gibbons, Gutman, Bongini & Bianco P.L.

(57) ABSTRACT

A business method for centrally managing documents in a client server system. The business method is operable in a client-server system with a database, a voice response system and a fax reception system to a telecommunications network. A user through the voice response system, provides a login request over the telecommunications network using a fax machine with a telephone. The system checks to determine if the user has an account and if the user does not have an account setting up an account with the user over the telecommunications network. Next, the user via the voice response system provides a category to be associate with a document to be faxed from the user. The user faxes a document to be stored in the database that is associated with a category under an account for the user. To retrieve a document previously faxed for storage, the information relating to the document is searchable and the document can be faxed back to the user fax machine. In an alternate embodiment, a computer readable medium and system is disclosed that corresponds to the method above.

18 Claims, 6 Drawing Sheets

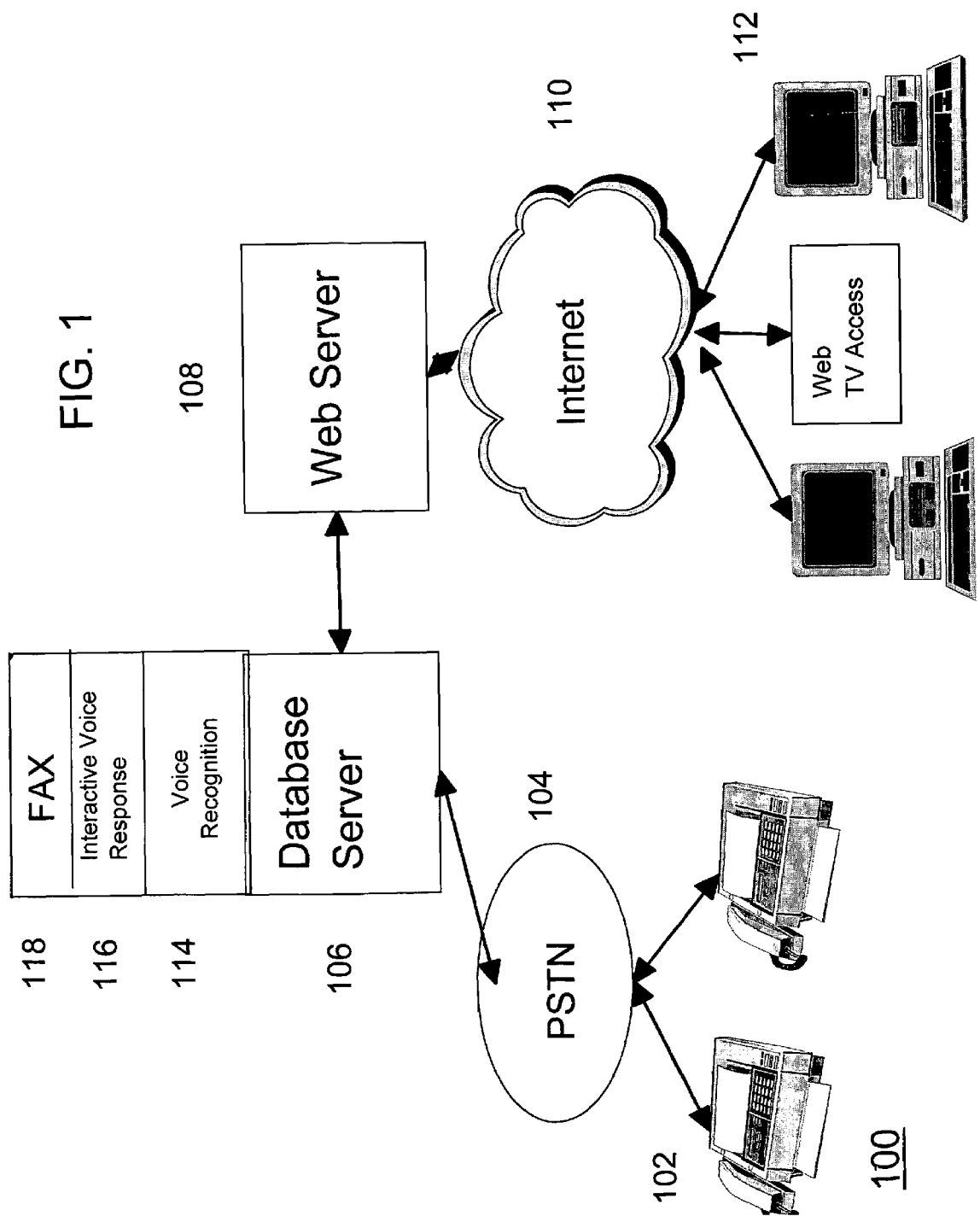

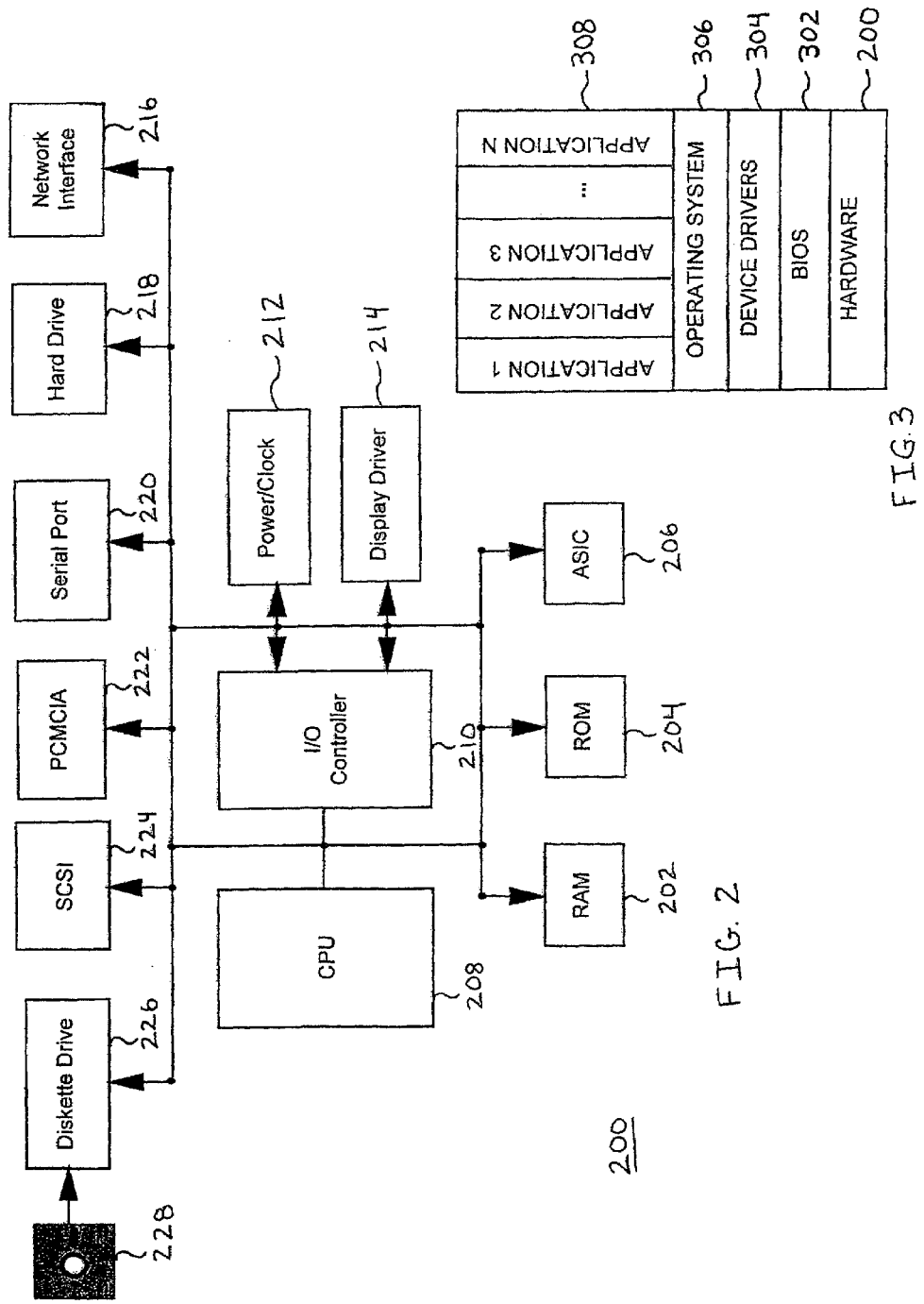

METHOD AND SYSTEM FOR CENTRALIZED INFORMATION STORAGE RETRIEVAL AND SEARCHING

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

Broadly this invention relates to electronic storage systems and networks. More particularly, this invention relates to the field of electronic storage of business and personal records over the Internet.

2. Description of the Related Art

Although facsimile machines have been around for more than fifty years, only within the last ten years due to improvements in optical scanning and printing have the price of fax machines dropped to a point to where most companies use fax machines. In fact, fax machines have become ubiquitous in most businesses today.

Consumers can purchase stand alone fax machines or fax machines in combination with other optical and printing options such as the Brother 6-1 MFC Printer which not only prints and faxes but can scan and copy as well. The use of fax machines and scanners have made written communications over long distances much easier.

Another technology advancement over the last ten years has been the advent of the World-Wide-Web ("Web"). The Web has become immensely popular largely because of the ease of finding information and the user-friendliness of today's browsers. A feature known as hypertext allows a user to access information from one Web page to another Web page by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across a wide variety of different platforms.

The Web relies on an application protocol called HTML (Hyper Text Mark Up Language) which is an interpretative scripting language for rendering text, graphics, images, audio, and real-time video on a Web compliant browser. HTML is independent of client operating systems. So HTML renders the same content across a wide variety of software and hardware operating platforms. Software platforms include Windows 3.1/95/98, Windows NT/2000, Copeland, AIX, Unix, and equivalent. Popular compliant Web-Browser includes Microsoft's Internet Explorer and Netscape Navigator.

The Web has made the access to information much easier to a large population of user as a result of the decrease in price of computer hardware and electronic storage combined with the increase of the throughput to many consumers such as cable modems, ADSL, DSL and WebTV™.

The availability of Web and the increase use of optical scanning technologies such as fax machines has not reduced the amount of paper used for personal and business records. The increase use of paper is due to many factors. One factor for the increase use of paper in business and personal records are that users of paper are unfamiliar with optical scanning technologies.

Another factor for the increase use of paper in business is the need for emergency backup of electronic medium. Many people lack the discipline to backup important documents electronically stored. Accordingly, the requirement to backup important documents stored electronically has slowed the adoption of optical scanning technologies to store documents.

Still, another factor for the increase use of paper, is the inability to access personal and business information while traveling. People often take copies of documents and information while they are away from their home or business for convenient access. For example, a person may take a document along with them such as a bank statement when going to loan officer about a loan. By taking a document with them, the user exposes the document to being lost, mutilated or inadvertently destroyed. Accordingly, a need exists to make the conversion, storage and retrieval of documents easy and secure for individuals and businesses to take advantage of optical scanning technologies available today.

SUMMARY OF THE INVENTION

According to one aspect of the invention, a business method for centrally managing documents in a client server system. The business method is operable in a client-server system with a database, a voice response system and a fax reception system to a telecommunications network. A user through the voice response system, provides a login request over the telecommunications network using a fax machine with a telephone. The system checks to determine if the user has an account, and if the user does not have an account setting up an account with the user over the telecommunications network. Next, the user via the voice response system provides a category to be associate with a document to be faxed from the user. The user faxes a document to be stored in the database that is associated with a category under an account for the user.

To retrieve a document previously faxed for storage, the information relating to the document is searchable and the document can be faxed back to the user's fax machine.

In an alternate embodiment, a computer readable medium and system is disclosed that corresponds to the method above.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 1 is a block diagram of a client-server system for carrying out this present invention.

FIG. 2 is a block diagram of the major electrical components of the database server of FIG. 1, according to the present invention.

FIG. 3 is a block diagram illustrating the software hierarchy for the information processing device of FIG. 2, according to the present invention.

DETAILED DESCRIPTION OF THE PREFERRED EMBODIMENTS

Figure 4:
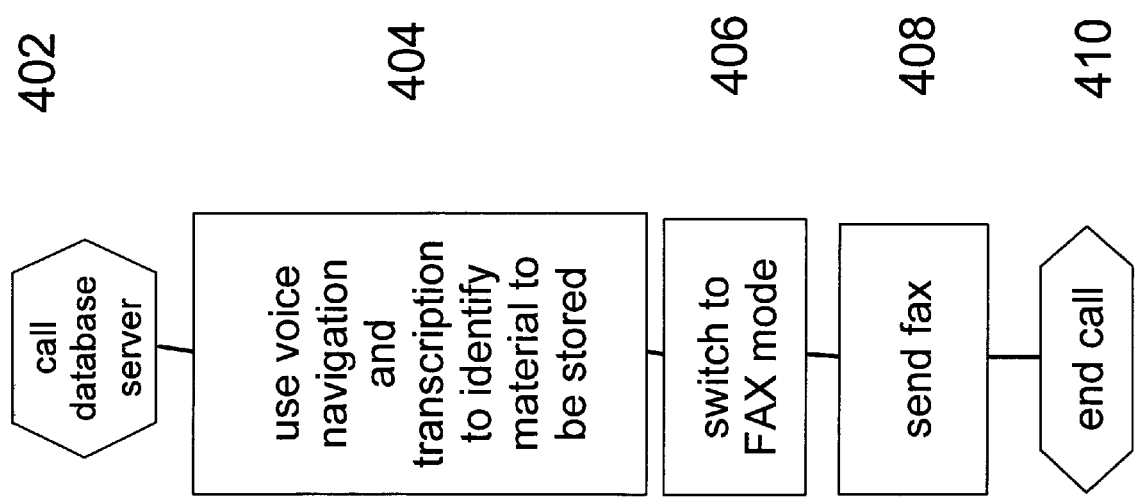
FIG. 4 is a process flow for an end-user to submit data and identifying information for the submission of paper documents to the database server, according to the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Client-Server Platform

FIG. 1 is a block diagram of a client-server system 100 for carrying out this present invention. A web server information processing system 108 such as a PC server, Unix or AIX Server, such as those available from IBM and Compaq or a server from Sun Microsystems or equivalent. The server 108 is linked to a plurality of client information processing systems 112, such as a PC or WebTV™ via a network 110, such as the Internet, running a browser application (not shown) such as Hot Java, Microsoft's Internet Explorer or Netscape's Navigator.

A database server 106 is coupled to the web server 108 for storing documents electronically. The database server 106 in the preferred embodiment is like the web server 108 is such as a PC server, Unix or AIX Server, such as those available from IBM and Compaq or a server from Sun Microsystems or equivalent. The database server 106 in the preferred embodiment runs IBM's DB/2 relational database, but other commercial relational databases such as those available from Oracle, Microsoft and equivalent can be used. The database server is coupled to an interactive voice response (IVR) system 118 with voice recognition, such as the IBM Direct/Talk 6000™ line of products. In addition, the database server 106 contains fax module 116, for receiving facsimile transmissions such as those WinFax brand fax modules. Although the database server 106 is shown as one unit containing the components of voice recognition 114, IVR 116 and fax 118, any and all combinations of these modules may be implemented external to the database server 106.

An exemplary database server 106 with components of voice recognition 114, IVR 116 and fax 118 has been shown to be used advantageously with the present invention is described in U.S. Pat. No. 5,471,521 with inventors Minakami et al., issued Nov. 28, 1995, entitled "Distributed system for call processing" which is commonly assigned herewith to International Business Machines and is incorporated herein by reference in its entirety.

An end-user fax machine 102, (or any optical scanning device with a phone) machine connected through the PSTN (Public Switch Telephone Network) 104 back to the database server 106. The end-user fax machine 102 can be a combination fax machine, such as the Brother Multi-Fax Machine MFC 8600 or equivalent.

Exemplary Database Server Hardware

Referring to FIG. 2, there is shown a block diagram of the major electrical components of the database server 104 in accordance with this invention. The electrical components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The operation of a computer comprising these elements is well understood. Network interface 216 provides connection to a computer network such as Ethernet, TCP/IP or other popular protocol network interfaces. Optional components for interfacing to external peripherals include: a Small Computer Systems Interface (SCSI) port 224 for attaching peripherals; a PCMCIA slot 222; and serial port 220. An optional diskette drive 226 is shown for loading or saving code to removable diskettes 228 or equivalent computer readable media. It is important to note that the system 200 can be implemented as any or all of the two information processing components of FIG. 1, the web server 108 and the database server 104.

The system 200 may be implemented by combination of hardware and software. Moreover, the functionality required for using the invention may be embodied in computer-readable media such as a floppy diskette, CD ROM, DVD ROM, Flash Memory or other removable computer readable medium to be used in programming an information-processing apparatus (e.g., a personal computer) to perform in accordance with the invention. Computer program means or computer program in the present context mean any expression, in any language, code or notation, of set of instructions intended to cause a system having an information processing capability to perform a particular function either directly or after either or both of the following: i) conversions to another language, code or notation; ii) reproduction in a different material form.

FIG. 3 is a block diagram illustrating the software hierarchy for the database server of FIG. 2 according to the present invention. The hardware 200 is the information processing system of FIG. 2. BIOS (Basic Input Output System) 302 is a set of low level of computer hardware instructions, usually stored in ROM 206, for communications between an operating system 306, device driver(s) 304 and hardware 200. Device drivers 304 are hardware specific code used to communicate between and operating system 306 and hardware peripherals such as a mouse, CD ROM drive or printer. Applications 308 are software application written in C/C++, Java, assembler or equivalent. Operating system 306 is the master program that loads after BIOS 302 initializes, that controls and runs the hardware 200. Examples of operating systems include DOS, Windows 3.1/95/98/NT, Linux, Unix, Macintosh, OS/2 and equivalent. In one embodiment, the application 308 that resides on the Database Server 106 and communicates with client 108 over the network 116.

The present invention can be realized in hardware, software, or a combination of hardware and software. The application 308 according to the present invention can be realized in a centralized fashion in one computer, or in a distributed fashion where different elements are spread across interconnected computer systems. Any kind of computer system—other apparatus adapted for carrying out the method described herein is suited. A typical combination of hardware and software could be a general purpose computer system such that it carries out the methods described herein. The present invention can also be embedded in a computer program product, which comprises all the features enabling the implementation of the methods described herein, and which—when loaded in a computer system—is able to carry out these methods.

Exemplary Process Flow for End-User to Store Data

FIG. 4 is a process flow for an end-user to submit data and identifying information for the submission of paper documents to the database server, according to the present invention. The user dials-in to database server 106 using telephone on fax machine 102. The voice recognition component 114 and IVR component 116 both coupled to the database server 106 allows the user to navigate a menu of options for sending a document for storage, steps 402 and 404. The document must be identified with such features as the name of the caller and the date of the call. Both of these are associated automatically by the application 308 running on the database server 106. The user can categorize the document to be sent by category such as insurance, banking, utility bills, travel and other custom categories, and in the preferred embodiment, the user can customize the subcategories such as payment, bill, information, credit card and other subcategories. In one embodiment the categories mirror categories used in financial packages such as Microsoft Money or Quicken. In another embodiment the categories, are suggested to the user depending on the payee. For example, the voice recognition component with the application 308 software recognizes that A.T.&T. is a utility category of telephone.

In another embodiment, the IVR 116 component and the voice recognition 114 component can be adjusted to account for the different geographies from which a user may dial-in to the database server 106. The system disclosed in U.S. Pat. No. 5,524,169, with inventors Cohen et al., issued Jun. 4, 1996, entitled "Method and system for location-specific speech recognition" which is commonly assigned herewith to International Business Machines" may be used advantageously with the present invention.

Once the document has been identified and/or characterized, the user switches the fax machine 102 to fax mode. The documents are the user has classified are now sent via facsimile to the database server 106 for storage by fax component 118, steps 406 and 408 and the user ends the call, step 410.

Exemplary Process Flow for Database Server to Store End-User Store Data

Figure 5:
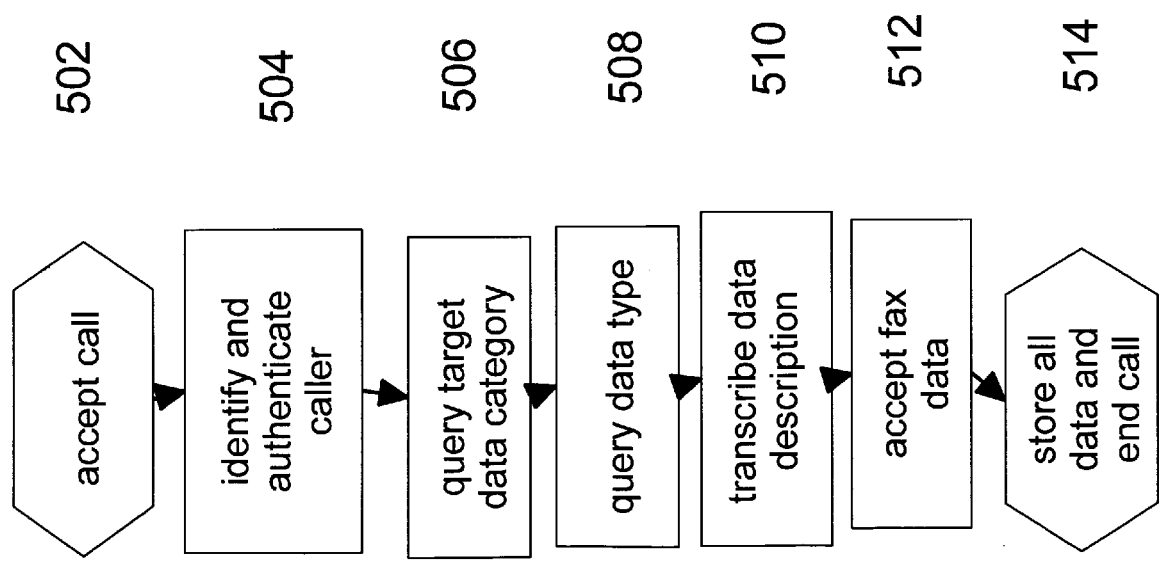
FIG. 5 is a process flow on the database server for accepting the converted information from the end-user process flow of FIG. 4, according to the present invention.

FIG. 5 is a process flow on the database server 106 for accepting the converted information from the end-user process flow of FIG. 4, according to the present invention. The steps in this sequence are the complementary steps performed by the application 308 running on the database server 106 when the user dials in using the process flow of FIG. 4.

The process begins with the database server 106 accepting the incoming call from an end user fax machine 102, step 502. The identify of the user and the authenticity of the user is checked, step 504. In one embodiment, this is done through voice recognition and speaker identification software. In another embodiment, this is done with a user name and password. A user can set up an account with the database server 106 using a credit card, debit card or any other financial account. Using the IVR 116 component and the voice recognition 114 component, a target category and data type are received from the user, using steps 506 and 508. The user may also transcribe a narrative describing the documents to be faxed. The user voice input is translated into text which is stored as part of the descriptor, step 510. Once the identity and description of the document is established, the database server is now ready to receive the fax of the document, step 512. The electronic fax copy along with the descriptions and the user identity is stored in a relational database by database server 106, step 514.

Exemplary Process Flow for Database End-User to Retrieve Stored Data

Figure 6:
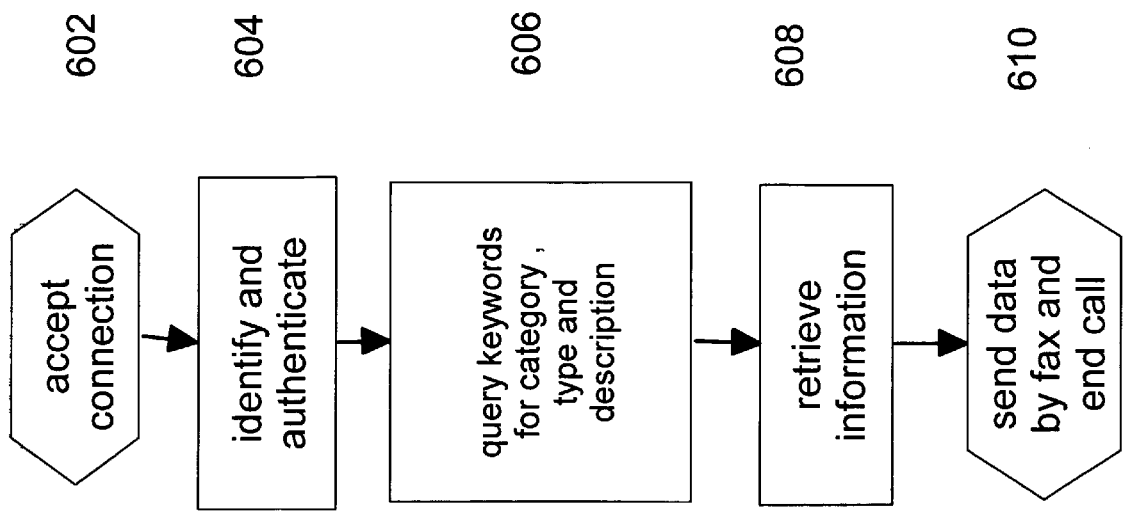
FIG. 6 is a process flow for an end-user to query data and retrieved data stored on the web server, according to the present invention.

FIG. 6 is a process flow for an end-user to query data and retrieved data stored on the database server 106, according to the present invention. Using a web access terminal such as a PC 112 or WebTV™ the user browsers the web server 108 to view documents that have been identified (and/or identified and categorized) and stored on the database server 106. The process begins with the web server accepting the connection from end user web access terminal 112, in step 602. Next, the user queries keywords for categories, descriptions, and identification of one or more documents they wish to access, step 604. The information provided by the user can be a simple database server 106 lookup in one embodiment, such as those used by popular search engines as www.Yahoo.com or www.Altavista.com which have been adopted to work on the target database of database server 106. The information matching the query is retrieved and the matching results presented to the user, steps 606, 608 and 610. In an alternate embodiment, the information is faxed back to the user fax machine 102.

Exemplary Process Flow for Database Server to Retrieve Stored Data

Figure 7:
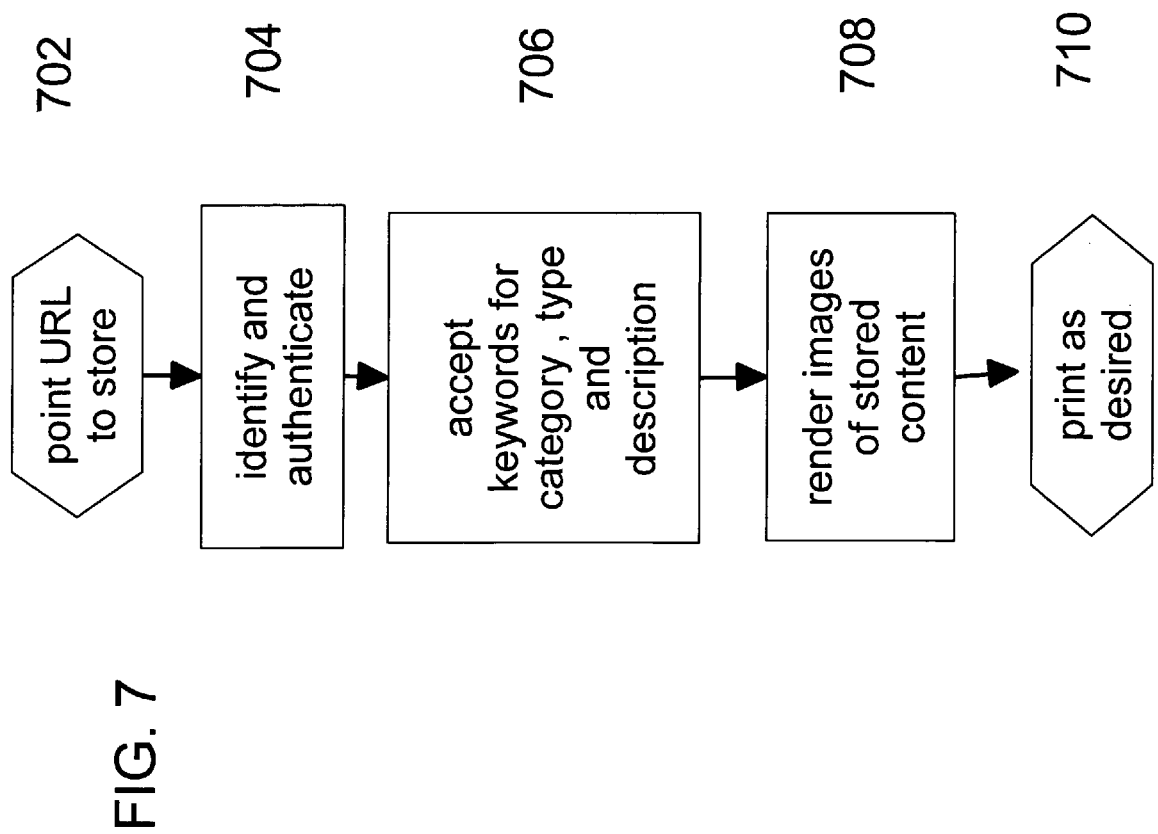
FIG. 7 is a process flow for an end-user to query data and retrieved data stored on the database server, according to the present invention.

FIG. 7 is a process flow for an end-user to query data and retrieved data stored on the database server, according to the present invention. The steps in this sequence are the complementary steps performed by the application running on the database server 106 and web server 108 when the user connects in using the process flow of FIG. 6.

The process on the web server 108 begins with a user pointing to a URL (Uniform Resource Locator) or web address of the web server 108, step 702. A user id and password is received to authenticate and to identify the user, step 704. The web server 108 receives keywords for a query of the information stored, step 706. In one embodiment the information provided by the user can be a simple database server 106 lookup. And in another embodiment, the data can be mined using the techniques described in U.S. Pat. No. 5,787,425 with inventor Bigus issued Jul. 28, 1998, entitled "Object-oriented data mining framework mechanism" which is commonly assigned herewith to International Business Machines and incorporated by reference in its entirety. Data mining is also described in U.S. Pat. No. 5,884,305 with inventors Kleinberg et al., issued Mar. 16, 1999 and entitled "System and method for data mining from relational data by sieving through iterated relational reinforcement" which is commonly assigned herewith to International Business Machines and incorporated by reference in its entirety.

Once the user selects a result from the query in step 706, the previously stored faxed document is displayed to the user on the web access devices 112. The user can then print the retrieved document from the web access device 112 or request that a copy be faxed to the user fax machine 102.

Although the application of the invention has been discussed with reference to the figures, the invention should not be construed as limited thereto, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for centrally managing documents in a client server system comprising the steps of:
    coupling to a server system with a database, one or more client systems over a network;
    linking the server to a telephone system;
    receiving at least one identifier over the telephone system for a document to be stored from a user's fax machine in the database;
    receiving a fax reception over the telephone system from at least one user's fax machine of at least one document corresponding to the at least one identifier received; and
    storing the fax reception of the at least one document with the at least one identifier in the database, wherein the identifier associated with the at least one document and the identifier is capable of being searched in the database.

2. A method for centrally managing documents according to claim 1, further comprising the steps of:
    receiving a search request for at least one identifier of at least one document from at least one of the one or more clients over the network;
    searching the database based upon the search request received; and
    presenting the results of the search of the database to the at least one of the one or more clients over the network.

3. A method for centrally managing documents according to claim 2, further comprising the steps of:
    receiving a selection from the at least one of the one or more clients over the network of the results presented;
    presenting an image of the document stored in the database over the network to the at least one of the one or more clients wherein the image corresponds to the selection of the results of the search.

4. A method for centrally managing documents according to claim 2, further comprising the steps of:
    receiving a selection from the at least one of the one or more clients over the network of the results presented;
    presenting an image of the document stored in the database over the network to the at least one of the one or more clients wherein the image corresponds to the selection of the results of the search.

5. A method for centrally managing documents according to claim 4, wherein the step of presenting an image includes presenting an image by sending the image to a fax machine that is under the control of a user of the at least one of the one or more clients.

6. A method for centrally managing documents according to claim 4, further comprising the step of:
    receiving a security identifier from a user of the at least one or more of the clients;
and wherein the step of presenting an image includes presenting an image only if the security identifier received is matched with a security identifier previously associated with the document.

7. A method for centrally managing documents according to claim 1, wherein in the step of receiving at least one identifier over the telephone system for a document includes receiving telephone keypad entry for selecting a predefined category.

8. A method for centrally managing documents according to claim 1, wherein in the step of receiving at least one identifier over the telephone system for a document includes receiving a voice response for selecting a predefined category.

9. The method for centrally managing documents according to claim 8, further comprising the steps of:
    receiving a search request for at least one identifier of at least one document from at least one of the one or more clients over the telephone system;
    searching the database based upon the search request received; and
    presenting the results of the search of the database over the telephone system.

10. The business method for centrally managing documents according to claim 9, further comprising the steps of:
    receiving a search request for at least one identifier of at least one document from the client network unit;
    searching the database based upon the search request received; and
    presenting the results of the search of the database over the telephone system to the client network unit.

11. A method for centrally managing documents according to claim 1, wherein in the network is the Internet.

12. A method for centrally managing documents in a client server system comprising the steps of:
    coupling to a server system with a database to a telephone system;
    receiving at least one identifier over the telephone system for a document to be stored from a user's fax machine in the database;
    receiving a fax reception over the telephone system from at least one user's fax machine of at least one document corresponding to the at least one identifier received; and
    storing the fax reception of the at least one document with the at least one identifier in the database, wherein the identifier associated with the at least one document and the identifier is capable of being searched in the database.

13. A business method for centrally managing documents in a client server system comprising the steps of:

coupling to a server system with a database, a voice response system and a fax reception system to a telecommunications network;

using the voice response system, receiving a login request from a user over the telecommunications network using a client network unit;

determining if the user has an account and if the user does not have an account setting up an account with the user over the telecommunications network;

using the voice response system prompting the user for a category to be associated with a document to be faxed from the user using a voice response; and receiving a fax from the user of a document to be stored in the database that is associated with a category under an account for the user.

14. A computer readable medium containing programming instructions for centrally managing documents in a client server system, the programming instructions comprising:

coupling to a server system with a database to a telephone system;

receiving at least one identifier over the telephone system for a document to be stored from a user's fax machine in the database;

receiving a fax reception over the telephone system from at least one user's fax machine of at least one document corresponding to the at least one identifier received; and storing the fax reception of the at least one document with the at least one identifier in the database, wherein the identifier associated with the at least one document and the identifier is capable of being searched in the database.

15. The programming instructions of claim 14, further comprising the steps of:

receiving a search request for at least one identifier of at least one document from at least one of the one or more clients over the telephone system;

searching the database based upon the search request received; and presenting the results of the search of the database over the telephone system.

16. A central fax storage and retrieval system for centrally managing documents over a telecommunications network comprising:

a server coupled to a telecommunications network;

a fax receiver coupled to the server for receiving faxes sent from a user's fax machine;

a telephone voice response system coupled to the server, the telephone response system having pre-recorded message prompts and voice recognition software for receiving user selections of the prerecorded message prompts, and the telephone response system receiving a message identifying a user; and a database coupled to the server, the database capable of storing electronically faxes received from the user's fax machine along with user information including user selections and user identification.

17. The system according to claim 16, further comprising:

a voice recognition system for identifying a user by the voice message received.

18. The system according to claim 17, wherein the voice recognition system converts user voice messages received into user information using speech-to-text algorithms tuned to telephony.

* * * * *